United States Patent
Palmer

(10) Patent No.: US 6,187,411 B1
(45) Date of Patent: *Feb. 13, 2001

(54) STITCH-REINFORCED SANDWICH PANEL AND METHOD OF MAKING SAME

(75) Inventor: Raymond J. Palmer, Newport Beach, CA (US)

(73) Assignee: The Boeing Company, Seattle, WA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/943,950

(22) Filed: Oct. 3, 1997

Related U.S. Application Data

(60) Provisional application No. 60/027,608, filed on Oct. 4, 1996.

(51) Int. Cl.$^7$ ............................................. B32B 3/06
(52) U.S. Cl. ................. 428/102; 416/229 R; 416/230; 428/99; 428/104; 428/120; 428/316.6; 428/317.9; 428/318.4; 428/318.6
(58) Field of Search ........................... 428/99, 102, 120, 428/318.4, 317.9, 318.6, 316.6, 104; 416/229 R, 230

(56) References Cited

U.S. PATENT DOCUMENTS

| | | | |
|---|---|---|---|
| 2,692,219 | | 10/1954 | Slayter et al. .................. 428/102 |
| 3,573,144 | * | 3/1971 | Andersen ...................... 428/316.6 |
| 3,960,236 | | 6/1976 | Holmes ........................... 428/102 |
| 4,196,251 | * | 4/1980 | Windecker ...................... 428/102 |
| 4,206,895 | | 6/1980 | Olez .................................. 244/123 |
| 4,256,790 | | 3/1981 | Lackman et al. .............. 428/102 |
| 4,299,871 | | 11/1981 | Forsch ............................. 428/102 |
| 4,331,723 | | 5/1982 | Hamm ................................ 428/61 |
| 4,411,939 | | 10/1983 | Hawkins et al. ............... 428/102 |
| 4,563,785 | | 1/1986 | Samelson .......................... 5/472 |
| 4,828,206 | | 5/1989 | Bruno et al. .................... 244/132 |
| 5,308,228 | | 5/1994 | Benoit et al. .................. 416/230 |
| 5,624,622 | * | 4/1997 | Boyce ............................... 29/432 |

* cited by examiner

*Primary Examiner*—Nasser Ahmad
(74) *Attorney, Agent, or Firm*—Alston & Bird LLP

(57) ABSTRACT

A stitch-reinforced sandwich panel with improved flatwise tensile strength, improved skin to core peel strength, and substantially reduced damage propagation from impact includes a relatively non-compressible foam core, a dry reinforcing layer of fibers placed on each of the opposite faces of the foam core; and high strength thread stitched with a high density of stitches over the entire panel through each of the reinforcing layers and the foam core. The skins are then impregnated with a resin system to complete the structure.

4 Claims, 2 Drawing Sheets

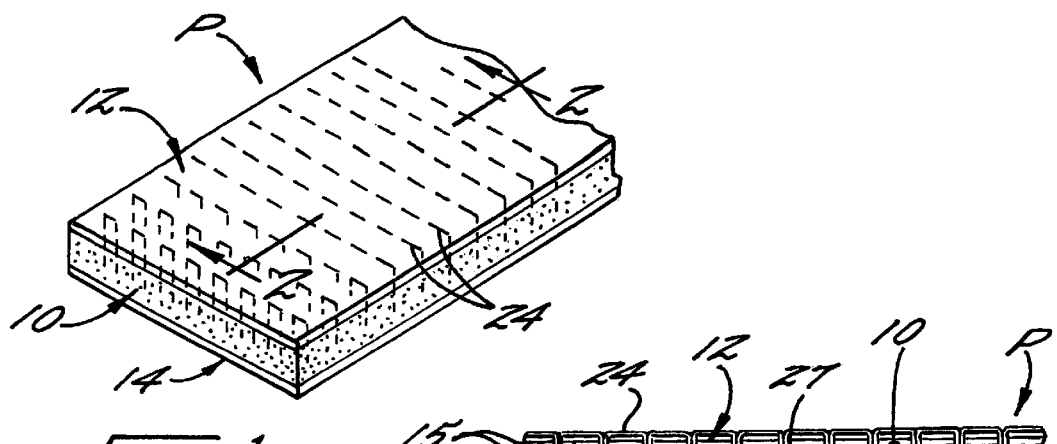
Fig. 1.
Fig. 2.
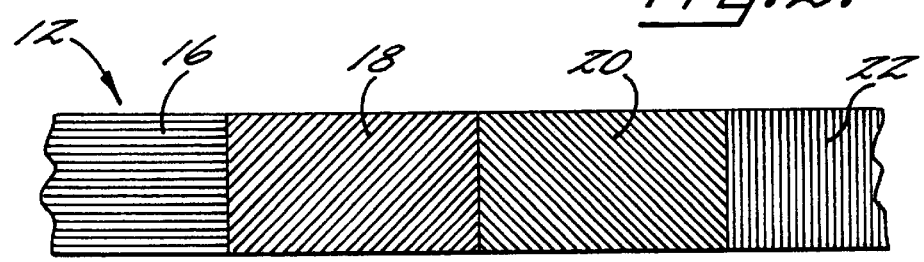
Fig. 3.
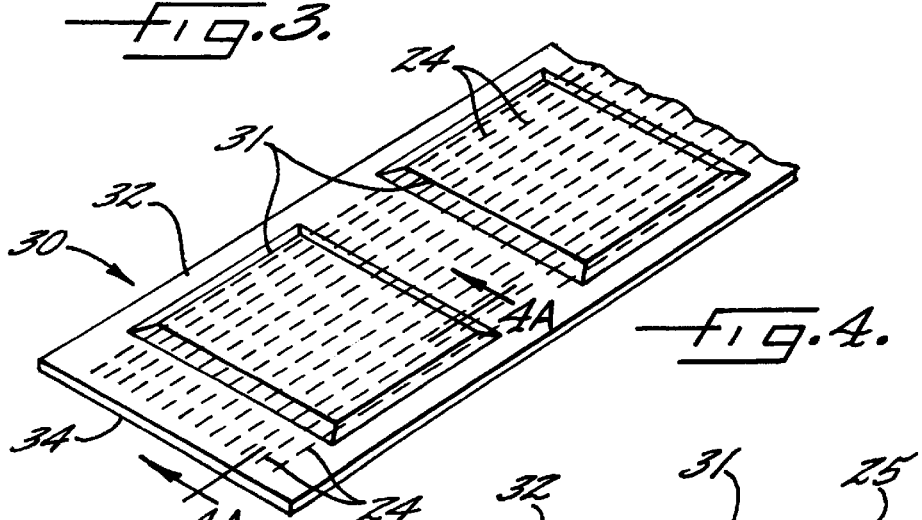
Fig. 4.
Fig. 4A.

STITCH-REINFORCED SANDWICH PANEL AND METHOD OF MAKING SAME

CROSS-REFERENCE TO RELATED APPLICATION

This application claims the benefit of U.S. Provisional Application Ser. No. 60/027,608, filed Oct. 4, 1996.

FIELD OF THE INVENTION

This invention relates in general to composite sandwich panels as well as methods of making such panels and, more particularly, to a stitch-reinforced sandwich panel having improved tolerance for damage caused by impact from a foreign object.

BACKGROUND OF THE INVENTION

Reinforced composite structural panels, typically sheet laminate structures, are well-known and frequently used in a variety of structures where other structural materials, such as metals, are not desired. These reinforced composite sheet laminate structures are used in the production of vehicles, such as boats, in some automobile bodies, and in aircraft. The reinforced composite materials are highly effective in their strength to weight ratio and thereby afford significant advantages over the conventionally used structural materials of wood, metals and the like.

Typically, these reinforced composite panels are formed of glass fiber-synthetic resin materials. Moreover, they are often constructed as multi-ply panels or so-called "sandwiched panels."

The use of multi-layer panels with foam cores has also been known. These foam cores are also provided with surface layers of resin-impregnated glass fibers. However, the presently available reinforced composite panels which utilize foam cores are subject to several limitations, most notably that when used under high load conditions, they frequently delaminate.

One such reinforced panel which utilizes a glass fiber skin and a foam core is taught in U.S. Pat. No. 4,411,939 to Hawkins, et al. The panel in the Hawkins, et al. patent is capable of being conformed to a desired shape, as for example, being curved to shape the hull of a boat. The skins of the laminated structure in the Hawkins, et al. patent utilize a polyurethane foam core along with glass fiber skins impregnated with a polyester resin. Interlocking strips of foam core are individually wrapped with a sheet of fiberglass and the strips are fit together and held in interlocking relation by stitching, staples, or adhesive. The stitches are used only for purposes of holding the fiberglass webs in place on the foam strips for later processing.

U.S. Pat. No. 2,692,219 to Slayter, et al. discloses the use of structural panels having an interior core with cement-like skins. The panel in Slayter, et al. is used primarily for heat and sound insulation partitions and the like. The panel has a core formed of a porous board into which glass fibers are bonded with a resinous material. The outer faces of the board are covered by layers of a cementitious material which is applied as a slurry and the panel is then heated to cure the cement. Prior to curing, however, glass fiber thread is stitched through the panel in a low stitch-density matrix, such as on 2-inch centers, with the looped ends of the thread extending from the faces of the porous board into the cement layers. Upon hardening of the cement, the loops are imbedded therein. The stitching is used to prevent delamination of the panel, but the panel would not have significantly improved out-of-plane (90° to the surface of the panel) tensile strength. Thus, Slayter does not disclose a damage-tolerant structure.

U.S. Pat. No. 4,256,790 to Lackman, et al. discloses a composite structure in which composite panels (i.e., resin-impregnated fiber sheets) are bonded together at a joint which is then reinforced by a composite thread sewn in a series of stitches through the panels. Stitching is concentrated only in the most critical areas of the stiffened panel construction, namely, at the tension point of the radius between the skin and a stiffener and between opposite skins that make the web of a stiffener. Stitching also occurs at the point of the honeycomb structure where the opposite skins are in facewise contact with one another. The composite members are staged (i.e., heated and compressed to remove excess resin) prior to stitching.

U.S. Pat. No. 4,331,723 to Hamm discloses a structure for a joint in which a wedge-shaped composite insert is covered on its three sides by graphite-epoxy laminate layers. Adjacent the insert, the laminates are stitched together with a thread preferably of Kevlar.

U.S. Pat. No. 4,828,206 to Bruno, et al. discloses a wing structure for a hydrodynamic ram. This wing structure is in the form of a panel using glass or graphite skins which control the hydraulic ram effect of an exploding shelf inside the wing structure. Pairs of rows of stitching are used with one of the rows of a pair on each side of a bolted joint. The joints also have a ply build-up and the stitching is used to control the spread of damage and serve as a locating line for a "blow-out." The stitching is performed in a B-Stage lay-up, that is, in a wet stage which is stitched and then cured. This stitch line creates a line of weakness for controlling the location of a failure in a tension or compression loaded skin.

Finally, U.S. Pat. No. 5,308,228 to Benoit et al. discloses a gas turbine blade having a central core of pre-impregnated fiber material, the outer surfaces of which are covered by woven composite materials, preferably pre-impregnated fiber material. The entire construction is then held together by a thread stitched through the various layers. Density of stitching varies over the surface of the blade, being highest toward the tip and lowest toward the root. After stitching, the structure is then impregnated and polymerized in a mold to obtain a finished blade. Benoit discloses that the central core may include inserts of a non-resinous nature, such as metal or foam. The outer layers may be stitched prior to impregnation. Benoit is not concerned with producing a structure having improved tolerance for impact damage caused by a foreign object.

There has been a need for a sandwich panel with improved flatwise tensile strength and capable of substantially reducing damage propagation from impact by a foreign object, such as a falling tool box, a rock from the runway, etc. The panels currently in existence do not fulfill this need.

SUMMARY OF THE INVENTION

It is, therefore, one of the primary objects of the present invention to provide a sandwich panel having improved flatwise tensile strength and substantially reduced damage propagation from impact.

It is another object of the present invention to provide a sandwich panel and a method of making such a panel in which a core can be assembled with dry non-matrix-impregnated fiber layers on opposite faces thereof prior to impregnation with resin.

It is a further object of the present invention to provide a large but lightly and uniformly loaded sandwich structure which has high strength-to-weight ratio and which provides damage tolerance and resistance to out-plane loading, such as tensile pull off or peel of skins from the core.

To these ends, the invention provides a stitch-reinforced sandwich panel which has improved flatwise tensile strength and substantially reduced damage propagation from impact. The reinforced panel of the present invention includes a relatively non-compressible foam core of a desired shape and configuration. The core is preferably a low-density non-porous foam. The foam core is preferably one capable of withstanding up to 100 pounds per square inch of compressive force at the temperature expected to be encountered in use, without yielding to that compressive force.

Outer skins comprising dry reinforcing layers of woven or warp/knit fabric are applied, on opposite faces of the foam core. The reinforcing fiber layers are preferably formed of high strength-to-weight materials such as glass fibers, carbon fibers, Kevlar, etc. Nylon, polyester, and the like may alternatively be used where lower stiffness is desired.

In one embodiment of the invention, each of the outer skins is formed of a plurality of plies of fiber material laid on top of each other. Each ply may be uni-directional, bi-directional, or otherwise woven or warp knitted. Certain of the plies in each of the layers forming part of an outer skin may have fiber orientation which is different from other plies in that skin.

A high-strength thread is used to stitch all of the fiber reinforcing layers to the foam core and through the foam core. Each stitch of the high-strength thread is stitched through fiber layers on one side, through the foam core and through the fiber layers on the opposite side. A high-density stitching is employed over the full surface of the panel.

The layers or skins are secured to the foam core with a stitching having an overall density of about 16 stitches per square inch to about 128 stitches per square inch, and preferably an overall density of about 40 stitches per square inch. This enables a production of a sandwich structure having a high strength to weight ratio and which can be later impregnated with a matrix to complete the panel construction.

The present invention also provides a method of making a stitch-reinforced sandwich panel. The method comprises applying to a non-compressible foam core on opposite surfaces thereof, a dry non-matrix impregnated reinforcing layer. The opposite layers or skins are then stitched through the foam core with a high-strength thread over substantially the entire surface area of the core with a high density of stitching. After the skins are stitched to the core, the entire assembly is impregnated with resin, usually of polyester, epoxy or modified phenolic type, and placed on a tool under vacuum bag or autoclave pressure. Resin may be applied in liquid form by spray, squeegee, etc., or in solid form by laying a resin film on the tool surface and then allowing the resin to melt and impregnate the skins under vacuum and oven or autoclave heat and pressure.

This invention possesses many advantages and has other purposes which will be made more fully apparent from a consideration of the forms in which it may be embodied. Some of the forms of these stitch-reinforced sandwich panels, as well as the method of making the panel, are more fully described in the accompanying detailed description and more fully illustrated in the accompanying drawings. However, it is to be understood that these drawings and the following detailed description are set forth only for purposes of illustrating and describing the general principles of the invention and are not to be taken in a limiting sense.

BRIEF DESCRIPTION OF THE DRAWINGS

Figure 5:
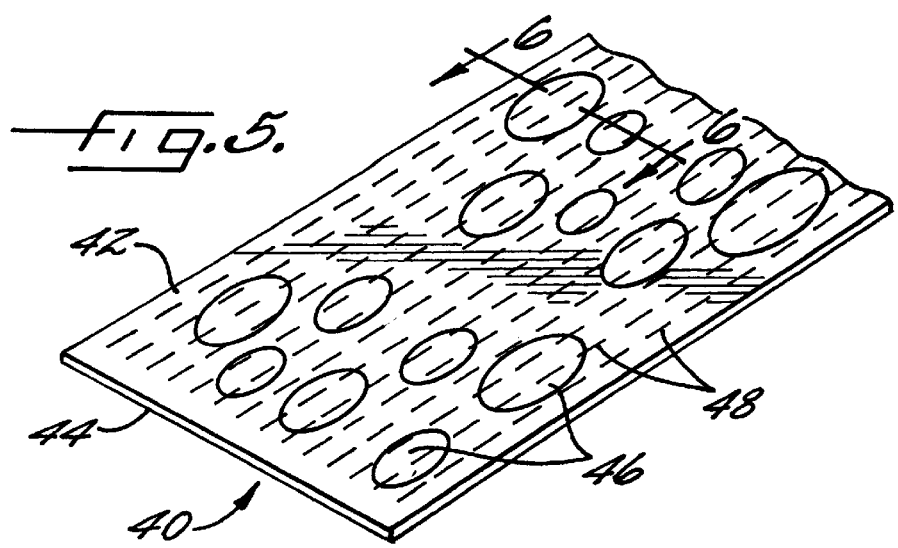
Figure 6:
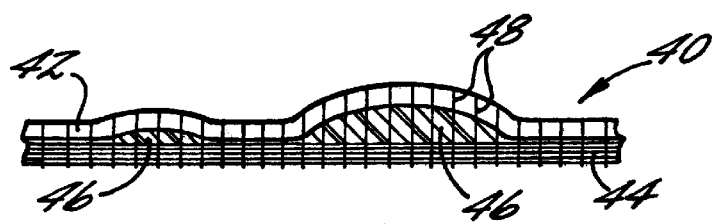
Figure 7:
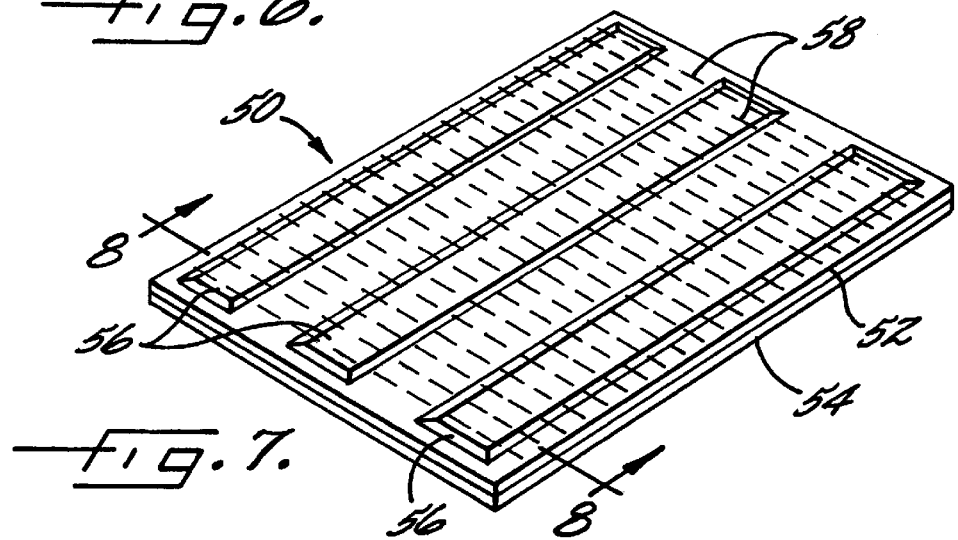
Figure 8:
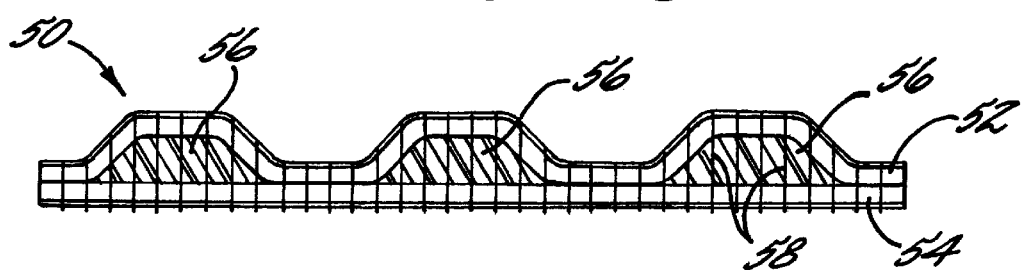

Having thus described the invention in general terms, reference will now be made to the accompanying drawings in which:

FIG. 1 is a perspective view of a stitch-reinforced sandwich panel constructed in accordance with the present invention;

FIG. 2 is a cross-sectional view taken on line 2—2 of FIG. 1, showing a stitching pattern through both outer skins and a central foam core;

FIG. 3 is a top elevational view of an outer skin with the various layers broken away to show one possible fiber ply arrangement in the outer skin;

FIG. 4 is a fragmentary perspective view showing a sandwich panel structure with two discrete foam cores located between the skins and with the skins closing together across the center of the panel between the two foam cores;

FIG. 4A is a cross-sectional view taken on line 4A—4A of FIG. 4;

FIG. 5 is a fragmentary perspective view showing a panel in accordance with the present invention having stiffening beads disposed between the skins;

FIG. 6 is a sectional view taken along line 6—6 of FIG. 5;

FIG. 7 is a perspective view of a panel constructed in accordance with the present invention having hat-shaped stiffeners; and FIG. 8 is a cross-sectional view, taken along the plane of line 8—8 of FIG. 7.

DETAILED DESCRIPTION OF THE DRAWINGS

Referring now in more detail and by reference characters to the drawings which illustrate a preferred embodiment of the present invention, P designates a stitch-reinforced sandwich panel comprising a relatively non-compressible foam core 10 with a pair of outer skins 12 and 14.

The foam core 10 is preferably a rigid closed-cell core which is capable of being cast, formed, or shaped to conform to a particular contour. The foam core 10 advantageously is capable of withstanding compression loads of up to 100 pounds per square inch at a use or processing temperature such as room temperature, 250° F., or 350° F., without substantially deforming. The foam core is preferably a closed-cell type of a lightweight synthetic material such as a polyurethane, phenolic, isocyanate, or other type of foam which has a high strength-to-weight ratio. The core advantageously has a density from about 4 to 16 pounds per cubic foot. In a preferred embodiment, the foam core is a polyurethane or a Rhocell type core having an overall density of about 4 to 6 pounds per cubic foot.

The skins 12 and 14 are preferably identical in construction, although not necessarily so. The skins are formed of one or more layers 15 of structural fiber materials, such as glass, boron, carbon, Kevlar, etc. Outer skins 12 and 14 may each be comprised of a single layer of fibers oriented in a desired direction. More preferably, however, the outer skins 12 and 14 are formed of plural plies of fibers. FIG. 3 illustrates one possible ply lay-up including a first ply 16 of 0 degree fibers, a second ply 18 of plus 45 degree fibers disposed over the ply 16, a third ply 20 comprised of minus 45 degree fibers disposed over the second ply 18, and a final layer 22 of 90 degree fibers which are disposed over the ply 20. One preferred construction uses eight plies in each of the opposite skins, in a 0°/+45°/−45°/90° pattern. Any ply arrangement which is known in the prior art may be used for this purpose, of which bi-woven fabric is a good example.

Each of these plural-ply sheets or skins 12 and 14 are then secured to the outer faces of the core 10 by means of stitches 24. The stitches 24 are formed by passing a needle (not shown) which is threaded with a thread 25 through the upper skin 12, through the core 10, and through the lower skin 14. The loop of thread 25 at the outer surface of lower skin 14 is locked by a bobbin thread 26 by knotting, in known manner. In the embodiment as shown in FIGS. 1 and 2, the core 10 is rectangular in shape, although the core can be any desired shape and size. Moreover, the core 10 is illustrated as having flat surfaces, but the surfaces may alternatively be curved and the core may vary in thickness to conform to a desired configuration.

The stitching is applied in a high-density pattern of about 16 to 128 stitches per square inch. Moreover, in a more preferred embodiment, the density of the stitching should be at least 20 stitches per square inch and, even more preferably, the density of the stitching should be about 40 stitches per square inch. By using a high density of stitching, it is possible to control damage tolerance and to confine the spread of damage from impact to a specific area.

By reference to FIG. 2, it can be seen that the stitching 24 occurs through the pair of skins 12 and 14 and completely through the foam core 10 in order to provide a sandwich panel. The stitching usually occurs in rows, and the stitches in each row are parallel to one another in that row, although other forms of stitching may be employed. Thus, even though the skins are completely dry, that is, they are not impregnated with any resin matrix, the panel has sufficient structural integrity to be handled for further processing. Moreover, the panel can be bent to a moderate degree to conform to a particular desired curvature or surface configuration. The panel can then be impregnated with resin and cured in place on a tool. Thus, the panel can be stitched in a relatively flat condition and later contoured, impregnated, and cured.

The stitchings which may be used in the panels are preferably formed of synthetic fiber threads which will absorb some of the resin matrix when the panel is impregnated or otherwise wetted. This will enhance the overall strength-to-weight ratio. Suitable threads, depending on the operating temperatures expected to be encountered, include Kevlar 29, Kevlar 49, Kevlar 149, Spectra, glass, carbon, nylon, and polyester. Any of a number of known stitching methods may be employed including lock stitching, chain stitching, or the like. Other forms of known stitching patterns may also be used. It is important in connection with the present invention to use a high density of stitching over essentially the full surface area of the panel.

After the panel has been stitched to a particular structure or otherwise formed in a desired shape, the skins may be resin-impregnated with any of a number of suitable well-known resin matrixes. For example, a number of epoxy resin, polyester, or phenolic resins may be used. Suitable effective resins include an epoxy resin, Shell 828 with room temperature cure, RF-250 epoxy from Applied Poleronic (a 250° F. cured resin), RF-350 from Applied Poleronic, or Hexcel 3501-6 epoxy resin (a 350° F. cured resin), although other resins may also be employed.

In an alternative method of the invention, the foam core is coated with a layer 27 (FIG. 2) of rubberized or elastic material prior to laying the skins and stitching the skins to the core. The elastic material is pierced by the needle during stitching, but after the needle is withdrawn from the hole, the hole in the elastic material tends to be self-closing, i.e., the elastic material adjacent the hole closes about the threads. In this way, the elastic material prevents excess resin from infiltrating the stitch holes in the foam core during impregnation of the panel. By preventing accumulation of excess resin in the holes, the weight of the panel is reduced.

An alternative method for reducing resin accumulation in the stitch holes is to apply the resin to the skins in the form of a thixotropic resin, rather than a low-viscosity liquid.

The panels produced in accordance with the present invention may be large in size, but their application is not limited to any particular size or shape. Moreover, they may be constructed as a lightly and uniformly loaded sandwich structure. In this way, they provide a very high strength-to-weight ratio. These sandwich structures provide good damage tolerance and strength under 90° out-of-plane surface loading.

The stitch-reinforced panels thus far described have a single unitary foam core. However, other panel constructions using two or more discrete foam cores are also encompassed within the scope of the present invention. FIGS. 4 and 4A illustrate one such construction, in which a panel 30 includes two discrete cores 31 which are spaced apart and sandwiched between upper and lower skins 32 and 34. Stitching 24 secures the upper and lower skins 32 and 34 directly to each other in the regions of the panel 30 outside the foam cores 31, but the stitching 24 in the regions of the foam cores 31 extends through both skins 32 and 34 as well as through the cores 31, as best seen in FIG. 4A. This construction of panel 30 effectively results in two stitch-reinforced sandwich panels that are integrally attached to each other. Any number of cores 31 may be used.

FIGS. 5 and 6 illustrate a further embodiment of a panel 40 in which a plurality of discrete foam "beads" 46 are disposed between an upper skin 42 and a lower skin 44 and stitched through by stitching 48. The beads 46 are illustrated as being discrete, but alternatively may be connected for ease of handling by an overlying thin sheet of material to form a "beaded skin" which is then laid over lower skin 44 and covered by upper skin 42 prior to stitching.

FIGS. 7 and 8 illustrate yet another panel 50 in which a plurality of discrete foam stiffeners 56 (so-called "hat" sections) are disposed between an upper skin 52 and a lower skin 54 and then stitched through by stitching 58.

It has been shown in connection with the present invention that the stitching alone adds a 90 degree tensile pull-off strength to a laminate structure. Moreover, the stitching stabilizes the skins when loaded in compression and increases the load capability of the entire panel. In addition, the stitching also has been highly effective in substantially reducing propagation of impact damage and also minimizes any tendency toward delamination, which often occurs in connection with reinforced sandwich panels when impacted. Thus, there is a minimal failure from delamination as a mode of propagation in a compressive state.

In one preferred embodiment of the present invention, a panel was constructed using a polyurethane foam core of about four pounds per cubic foot density. Each of the skins were formed of glass fibers with each skin having a ply arrangement of 0 degrees, 45 degrees, minus 45 degrees and 90 degrees. These skins were stitched to the polyurethane core at about 40 penetrations per square inch. The stitch assembly was thereafter impregnated with a Hexcel 3501-6 epoxy type resin. The panels were secured with edges where the skins were brought together in facewise contact with one another at the ends thereof. Two identical panels of the type described were produced. However, one of the panels was not stitched and the other of the panels was stitched with a Kevlar 29, 1,600 denier, twisted thread locked to a lower bobbin thread of Kevlar 29, 400 denier.

In a tensile loading test at 90 degrees (i.e., normal) to the skins of the panel, the unstitched panel had a strength of 250 pounds per square inch whereas the stitched panel had a strength of 600 pounds per square inch. In a compression test with zero degrees to the stitching direction, that is longitudinally through the panel, the unstitched panel had a strength of 9,500 pounds and the stitched panel had a strength of 12,600 pounds. In compression, the unstitched panel had a strength of 2,000 pounds and the stitched panel had a strength of 7,400 pounds. It was found that the stitching added a 90 degree tensile strength to the entire panel when stitched.

Thus, there has been illustrated and described a unique and novel stitch-reinforced sandwich panel with greatly improved tensile strength and substantially reduced damage propagation from impact and which also has a high strength-to-weight ratio. Thus, the panel of the present invention and the method thereof also fulfills all of the objects and the advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

That which is claimed is:

1. A stitch-reinforced sandwich panel, comprising:

a foam core having a pair of opposite first and second faces;

first and second skins of fiber reinforcing material respectively covering the first and second faces of the foam core; and a reinforcing thread stitched through each of the skins and through the foam core to form stitches arranged in a generally regular pattern over substantially the entire faces of the foam core, the stitching joining the skins and the core together to form a stitch-reinforced sandwich panel;

wherein the foam core is formed of a plurality of discrete foam pieces that are spaced apart to form intervening spaces therebetween, and the first and second skins are in direct contact with each other and are stitched directly to each other in the intervening spaces between the discrete foam pieces.

2. The stitch-reinforced sandwich panel of claim 1, wherein the skins comprise layers of non-matrix-impregnated fiber material.

3. The stitch-reinforced sandwich panel of claim 1, wherein each skin comprises a plurality of layers of non-matrix impregnated fiber material.

4. The stitch-reinforced sandwich panel of claim 3, wherein the layers of each skin are knit together to form a warp knit fabric.

* * * * *